May 27, 1952 J. M. HETLAND 2,597,993

TUNABLE PLUG IN ASSEMBLY FOR HIGH-FREQUENCY OSCILLATORS

Filed Oct. 31, 1945 3 Sheets-Sheet 1

INVENTOR.
Julius M. Hetland

BY Ralph L. Chappell

ATTORNEY

May 27, 1952 J. M. HETLAND 2,597,993
TUNABLE PLUG IN ASSEMBLY FOR HIGH-FREQUENCY OSCILLATORS
Filed Oct. 31, 1945 3 Sheets-Sheet 2

INVENTOR.
Julius M. Hetland
BY
[signature]
ATTORNEY

May 27, 1952 J. M. HETLAND 2,597,993

TUNABLE PLUG IN ASSEMBLY FOR HIGH-FREQUENCY OSCILLATORS

Filed Oct. 31, 1945 3 Sheets-Sheet 3

INVENTOR.
JULIUS M. HETLAND
BY M. O. Hayes
ATTORNEY

Patented May 27, 1952

2,597,993

UNITED STATES PATENT OFFICE 2,597,993

TUNABLE PLUG-IN ASSEMBLY FOR HIGH-FREQUENCY OSCILLATORS

Julius M. Hetland, Fargo, N. Dak., assignor to the United States of America as represented by the Secretary of the Navy Application October 31, 1945, Serial No. 625,885

11 Claims. (Cl. 250—40)

This invention relates to tuning systems for radio devices, more particularly for transmitters.

In a specialized application, it was found necessary to provide a transmitter the signal of which was to be frequency modulated at a given sweep rate over a narrow range, the mean frequency of the transmitter to be variable so that the modulated signal would cover a broad frequency range. The primary object of the present invention is to provide an effective, simple signal generator and method of signal generation for accomplishing the foregoing purpose.

According to the invention, one of a series of plug-in coils is used in conjunction with a motor-driven tuning capacitor. The tuning motor is operated at a constant speed regardless of the plug-in coil selected. By adjusting the maximum capacity of the tuning capacitor, the band width through which the motor tunes the transmitter can be maintained constant for the various mean frequencies of the several plug-in coils. These are designed so that the transmitter is adapted to cover the assigned frequency range.

A further object is to provide an automatic arrangement for adjusting the tuning capacitor to the several plug-in coils that may be used, to maintain constant the sweep-frequency range regardless of the coil selected. A collateral object is to provide a novel tuning capacitor susceptible to such adjustment.

According to this phase of the invention, the plates of the tuning capacitor are coaxial, cylindrical segments of various diameters, with the rotor and stator plates alternating along a radius. The stator plates are supported at one end and the rotor plates at the opposite end. By supporting them for mutual axial adjustment, the maximum capacity and, to some extent, the minimum capacity can be varied. In each plug-in assembly there is means for axially adjusting the capacitor and consequently for attaining the desired uniform sweep-range for all the coils. In this arrangement a sufficiently close approximation of the desired sweep rate can be attained at all parts of each band swept, and for all parts of the broad band to be covered.

The invention will be better understood from the following detailed disclosure in which.

Figure 3:
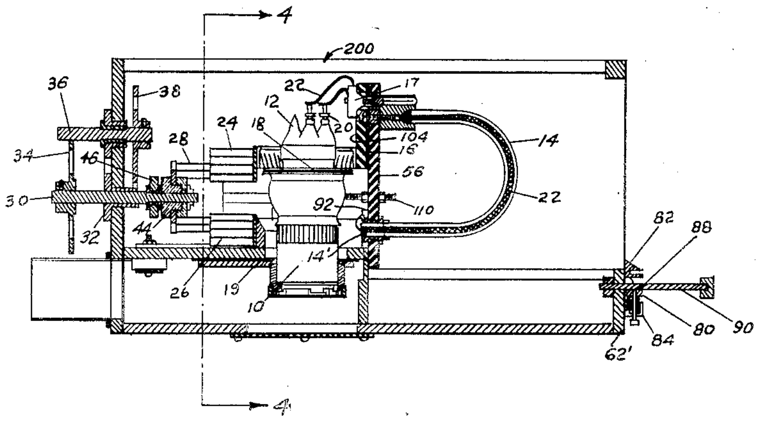
Fig. 3 is a sectional view of the apparatus taken along the line 3—3 of Fig. 2, with the front panel removed.
Figure 8:
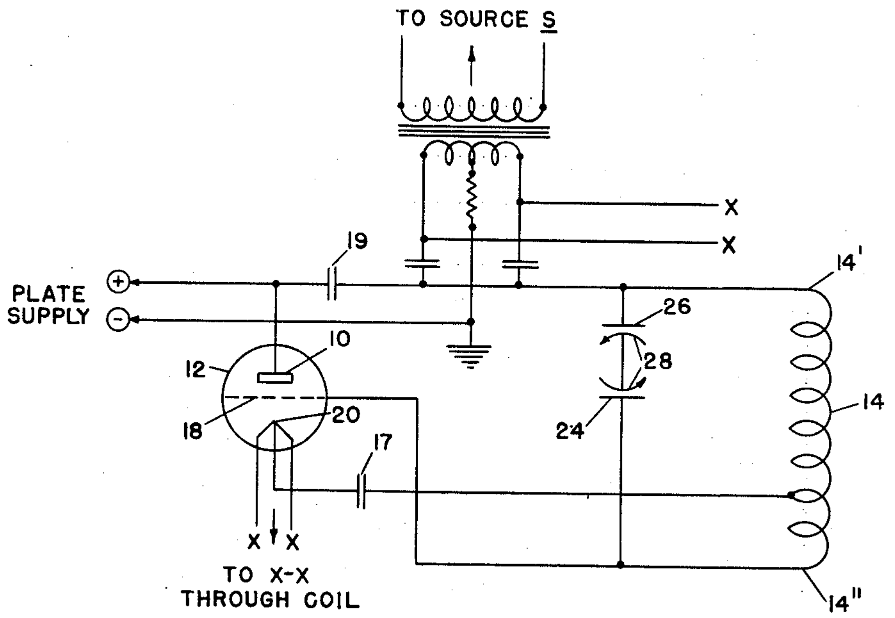
Fig. 8 is a schematic diagram of a tunable oscillator apparatus according to the present invention.
Figure 9:
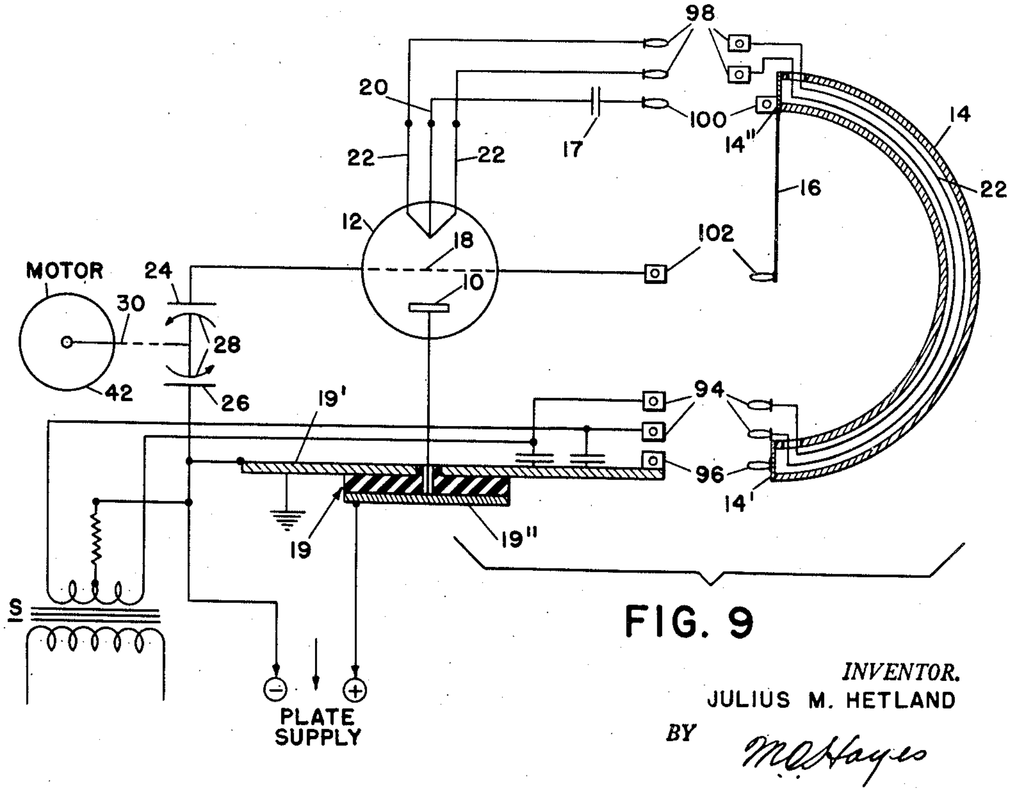
Fig. 9 is a diagrammatic view of the novel plug-in inductor in relation to the apparatus shown in Fig. 8.

In the illustrative embodiment shown in the drawings, the signal generator is a grounded-plate Hartley power oscillator. As shown in Fig. 8, plate 10 of triode 12 is connected to one end 14′ of a plug-in inductance comprising U-shaped tube 14 and conductive plate 16 (Fig. 9) which forms part of the tank inductance extending from grid to cathode. Grid 18 of the triode is connected to the opposite end 14″ of the two-part inductor. As shown in Fig. 9, the filament center-tap or cathode 20 is connected to the junction of conductive plate 16 and tube 14 of the plug-in inductor. An R.-F. blocking capacitor 19, the upper plate 19′ of which is grounded while the lower plate 19″ is conductively connected to plate 10. The capacitor 19 is incorporated in the triode mounting between triode plate 10 and inductor 14, and similarly an R.-F. blocking capacitor 17 is built into the unit between cathode 20 and the inductor. As shown in Fig. 3, the entire unit is housed in a box-like shield 200, which is at the D.-C. potential of grid 18, and at the R.-F. potential of plate 10. Filament leads 22 extend through tube 14 to the R.-F. ground-potential end of the inductor (Fig. 9).

Figure 1:
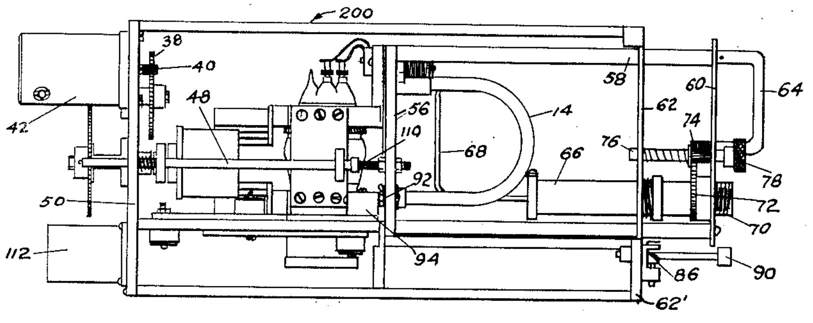
Fig. 1 is a side view of the transmitter apparatus with a side panel removed.
Figure 4:
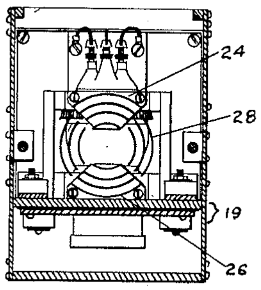
Fig. 4 is a transverse section of the same taken along the line 4—4 of Fig. 3.
Figure 5:
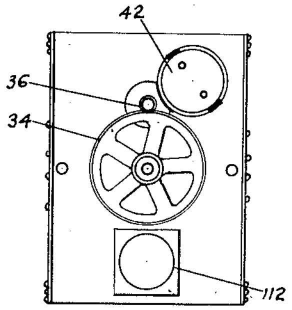
Fig. 5 is the rear external view of the apparatus as seen from the left end of Fig. 1.

In addition to the plug-in inductor and the inter-electrode capacity of the triode, a specialized tuning capacitor is provided, according to the present invention, for determining the operating frequency and frequency modulation range of the transmitter. As shown in Figs. 3, 4, and 9, there is provided a two-part stator, one part 24 of which is mounted on the grid contact structure and the other part 26 of which is mounted on the side of capacitor 19 which is at the D.-C. potential of grid 18. A two-section rotor 28 is rotatably mounted on a shaft 30 and is adapted to mesh with portions 24 and 26 of the stator, to constitute a symmetrical pair of variable capacitors in series. As shown in Figs. 3 and 4, the plates of capacitor 24, 26, 28 are cylindrical segments which are coaxial with the shaft 30 of rotor 28. The latter is axially slidable in a bearing 32 (Fig. 3) and carries a toothed gear 34 which meshes with splined pinion shaft 36, to drive gear 34 regardless of its axial position. Shaft 36 is driven by gear 38, and, as shown in Fig. 1, the latter is actuated by a pinion 40 on the shaft of motor 42 which is normally driven at a constant speed In Fig. 3, it will be seen that the plates of rotor 28 are insulated from shaft 30 by a bushing assembly 44.

For adjustably positioning the rotor 28 relative to the stators 24, 26, a transverse bar 46, (Fig. 2) is fixed to a pair of spaced parallel rods 48 which are slidable in suitable openings in end plate 50 of the shield 200 and in guides 52 on the side panels of the shield. Shaft 30 has a bearing allowing its rotation in bar 46 but constraining it to move axially with that bar. Compression springs 54 surround shafts 48 and urge bar 46 away from end plate 50. As will presently be described, springs 54, in coaction with the plug-in inductor assembly, vary the degree of interengagement of the rotor 28 and stator plates 24 and 26, varying the maximum capacity and to some extent the minimum capacity of the motor-driven capacitor. For constant motor speed, any desired sweep-frequency rate can be approximated within limits by capacitor adjustment with any of the several inductors selected, and the range with each inductor can be made equal to the range with the others.

The plug-in inductor assembly details will now be described with reference to Figs. 1, 2, 3, and 9 of the drawing. U-shaped tube 14 is mounted on plate 56 of insulating material which, in turn, is supported at its corners by four rods 58 on panel 60 and partition 62. Handle 64 on panel 60 facilitates insertion and removal of a plug-in unit. Rotatably mounted in panel 60 and partition 62, (Figs. 1 and 2) is a short coaxial line section 66 which carries a loop 68 at its inner end for inductively coupling a load to inductor tube 14. At its outer end line section 66 carries coaxial connector 70. Between panel 60 and partition 62 on line 66 is a segmental gear 72 in mesh with a pinion 74 on a shaft 76, which shaft also extends through panel 60 and partition 62. In front of panel 60 is a knob 78 by means of which shaft 76 and loop 68 can be rotated to adjust the load coupling. By virtue of suitable springs 76′, gear 72 and pinion 74 bind frictionally against panel 60 to prevent their accidental rotation.

Fig. 3 discloses a spring latch comprising vertical slide 80 on the lower portion of the permanent front wall 62′ of the shield 200. Slide 80 has an upper inclined portion 82, that maintains the plug-in unit in its inserted position. Slide 80 is depressed gradually against its spring 84 by partition 62 of the plug-in unit as that unit is forced into place. An intermediate inclined portion 86 (Fig. 1) on slide 80 cooperates with pin 88 on plunger 90 for withdrawing latch 80. By forcing plunger 90 axially with the thumb as the other fingers of the operator's hand embrace handle 64, the plug-in unit can be readily removed without any tendency of the whole oscillator to slide about; but the plug-in unit is securely retained in place otherwise.

Figure 6:
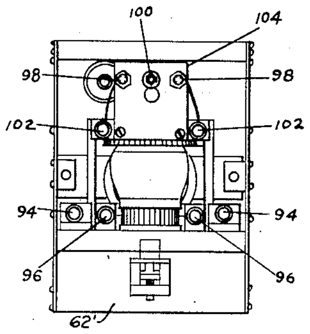
Fig. 6 is a front view of the apparatus as seen from the right of Fig. 1, with the plug-in assembly removed.
Figure 7:
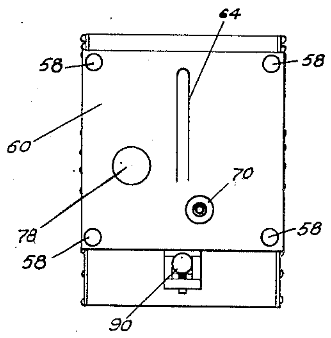
Fig. 7 is a front view of the apparatus as seen from the right of Fig. 1.

The detachable connection of the plug-in inductor unit to the tube is shown in Figs. 3, 6 and 9. At the end 14′ of inductor 14 closest to triode plate 10, there is a strip 92 extending laterally in two directions on insulating plate 56, for connection by parallel paths by tipjacks 96 to the R.-F. ground side 19′ of plate-blocking capacitor 19. The filament leads in the plug-in unit are connected to the filament source by tipjacks 94 (Figs. 6 and 9) and to triode 12 by tipjacks 98. A tipjack 100 also serves to connect cathode capacitor 17 to the plug-in inductor at the junction of conductive plate 16 and inductance tube 14. Conductive plate 16 is connected to grid 18 through laterally extending strips on insulating plate 56 through tipjacks 102. In the embodiment shown, the male portion of the tipjack is in the plug-in unit for jacks 94, 96 and 102, whereas the male portions of jacks 98 and 100 are on their stationary support 104 of insulating material.

Figure 2:
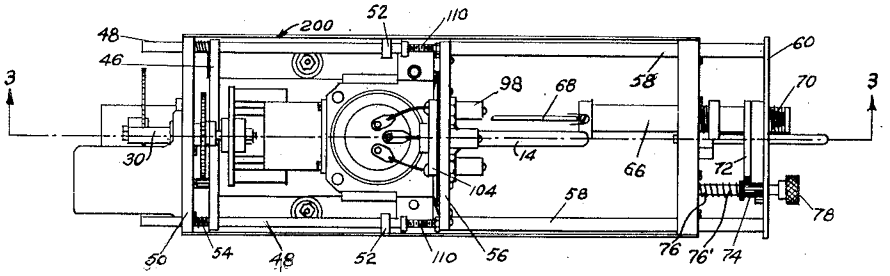
Fig. 2 is a plan view thereof with the top panel removed.

Fig. 2 shows a pair of threaded rods 110 fixed to plate 56 and in axial alignment with rods 48. Rods 110 are initially adjusted for determining the desired sweep-range, appropriately shifting rotor 28 of the capacitor axially. Thereafter, when that inductor is inserted, the sweep-frequency range is automatically correct for that unit.

Although the edges and the ends of the capacitor plates are shown in Figs. 1, 2 and 3 as straight, it is apparent that they might be curved if desired. Likewise, although these capacitor plates are shown to be of uniform thickness, they may be axially tapered or otherwise figured if desired. A good approximation of the desired sweep-frequency rate is achieved by adjusting the axial position of rotor 28 relative to sections 24 and 26. A more accurate result might be achieved if warranted through careful design of the plate contours.

A tube 112 (Fig. 1) is provided for connection to a blower (not shown). The cooling air thus provided is forced along the cooling fins of triode plate 10, being exhausted through the top of the shield. The triode filament terminals are similarly cooled, by means not shown.

The grid-bias, filament supply and plate supply means are all conventional. The constant sweep-frequency rate aspect of the invention is not dependent on these details, nor on the Hartley oscillator circuit of this embodiment. It is applicable to any tunable signal generator. The advantage of sub-dividing the assigned frequency band into many smaller bands is that in this way the generated signal is effective at any one frequency more frequently due to the shorter sweep cycle, yet the desired sweep rate is maintained. Also, high efficiency is realized with appropriate load coupling at each part of the broad band.

In a broader sense, the invention extends to a variable capacitor the maximum capacity of which is adjustable automatically by coaction with the plug-in inductor which it tunes, and to the structure of the capacitor itself. The broader aspect is useful not only in signal generators but in receivers as well, anywhere that automatic band-spread adjustment is advantageous.

Modifications and changes can be made in this invention without departing from the spirit and scope thereof as set forth in the appended claims.

What is claimed is:

1. The combination of an inductor assembly comprising an inductor and a variable capacitor including means for varying the range of capacitance values derivable from said capacitor, said assembly including detachable electrical connections between said inductor and said capacitor, and also including means responsive to connection of said inductor to said capacitor for automatically adjusting said range-varying means, whereby said capacitor determines a selected frequency range.

2. The combination comprising an inductor assembly including an inductor connectible to a capacitor to form therewith a tuned circuit and a variable capacitor having a pair of segmental cylindrical plates mounted for mutual rotation about a common axis to provide a range of capacitance values corresponding to the amount of rotation of said plates, said plates being adapted for mutual translatory adjustment along said axis, whereby to shift said range in accordance with the amount of translatory adjustment of said plates, said assembly also including means for electrically connecting said inductor to said capacitor and simultaneously to effect control of said axial adjustment, thereby to control the range of said capacitor.

3. A tuning circuit comprising a variable capacitor having a pair of segmental cylindrical rotor members and a pair of segmental cylindrical stator members, said rotor members and said stator members being substantially quadrantal in shape and having a common axis, means rotatably supporting said rotor members for interleaving rotary movement relative to said stators, means for causing axial movement of said rotor members relative to said stators, and an inductor unit comprising an inductor adapted to be connected to said capacitor, said unit further comprising means connected to said inductor for connecting said inductor to said capacitor and for simultaneously actuating said axial-movement-causing means selectively to position said rotor means axially of said stator means.

4. The circuit as defined in claim 3, wherein said supporting means comprises a shaft supporting said rotor members, and said axial movement-causing means comprises a shiftable frame, and means mounting said shaft for rotation in said frame and for translatory movement therewith.

5. The circuit as defined in claim 4 further comprising means limiting the translatory movement of said frame.

6. The combination comprising an adjustable condenser adapted to provide variable ranges of capacitance values, means defining a constant inductance value, said inductance-defining means having detachable electrical connections with said condenser to form with said condenser a tunable circuit having operating frequency values lying within ranges corresponding to said ranges of capacitance values, and means operable responsive to connection of said detachable connections between said inductance defining means and said condenser to select a predetermined range of capacitance values, thereby correspondingly to select a range of operating frequency values.

7. The combination comprising a continuously adjustable condenser adapted to provide variable ranges of capacitance values, means defining a constant inductance value, said inductance-defining means having detachable electrical connections with said condenser to form with said condenser a tunable circuit having operating frequency values lying within ranges corresponding to said ranges of capacitance values, motor means for continuously adjusting said condenser, and means operable responsive to connection of said detachable electrical connections between said inductance-defining means and said condenser to select a predetermined range of capacitance values, thereby correspondingly to select a range of operating frequency values.

8. A variable tuning circuit, comprising a condenser having relatively movable rotor and stator members, means supporting said rotor members for independent rotary and translatory motion relative to said stator members, means defining a constant inductance value, said inductance-defining means having detachable electrical connections with said condenser to form with said condenser a tunable circuit having operating frequency values lying within ranges determined by said relative translatory movement of said members, and means operably responsive to connection of said detachable electrical connections between said inductance-defining means and said condenser to produce translatory displacement of said members thereby to select a predetermined range of operating frequency values.

9. A multiple range variable tuning circuit, comprising a condenser having a two-part rotor and a two part stator, said rotor and stator parts including segmental cylindrical plates adapted for relative interleaving rotary and translatory movement, and an inductor unit detachably connectable to said condenser and including an inductor adapted to form with said condenser a tunable circuit having operating frequency values lying within ranges corresponding to the ranges of capacitance values derivable from said condenser according to the degree of interleaving of said rotor and stator parts, said unit also including means operable on attachment of said inductor to said condenser to vary the degree of interleaving of said parts, thereby correspondingly to vary the range of operating frequency values.

10. The tuning circuit as defined in claim 9 wherein said rotor and said stator parts are of substantially quadrantal form, whereby upon relative rotary movement of said parts the operating frequency of said circuit is varied within a predetermined range.

11. In a high-frequency oscillator operable at a plurality of frequency values, a plug-in assembly comprising an inductor having a predetermined inductance value, a multi-range variable capacitor, and automatic range-selecting means connecting said inductor and said capacitor for selecting a predetermined range according to said predetermined inductance value, thereby to select operating frequency values for the oscillator.

JULIUS M. HETLAND.

REFERENCES CITED

The following references are of record in the file of this patent:

UNITED STATES PATENTS

| Number | Name | Date |
|---|---|---|
| 1,527,578 | Sheriff | Feb. 24, 1925 |
| 1,552,185 | Alcox | Sept. 1, 1925 |
| 1,567,067 | Lindberg | Dec. 29, 1925 |
| 1,625,330 | Pinkus | Apr. 19, 1927 |
| 1,651,975 | Specht | Dec. 6, 1927 |
| 1,678,840 | Williams | July 31, 1928 |
| 1,715,880 | Willhagen | June 4, 1929 |
| 1,738,194 | Morris et al. | Dec. 3, 1929 |
| 1,772,839 | McIver | Aug. 12, 1930 |
| 1,810,985 | Reichenbach | June 23, 1931 |
| 1,947,584 | Deutscher | Feb. 20, 1934 |
| 2,059,299 | Yolles | Nov. 3, 1936 |
| 2,147,425 | Bock | Feb. 14, 1939 |
| 2,198,025 | Davies et al. | Apr. 23 1940 |
| 2,391,917 | Newkirk | Jan. 1, 1946 |
| 2,398,112 | O'Brien | Apr. 9, 1946 |
| 2,510,272 | Arnett | June 6, 1950 |